United States Patent [19]
Koff et al.

[11] 3,888,415
[45] June 10, 1975

[54] PARTICLE VAPORIZER
[75] Inventors: Irwin Koff; William G. Finnegan, both of China Lake, Calif.
[73] Assignee: The United States of America as represented by the Secretary of the Navy, Washington, D.C.
[22] Filed: June 27, 1974
[21] Appl. No.: 483,862

[52] U.S. Cl. ............... 239/2 R; 239/14; 239/136
[51] Int. Cl. ......................................... A01g 15/00
[58] Field of Search ............ 239/2 R, 14, 133, 135, 239/136

[56] References Cited
UNITED STATES PATENTS

| | | | |
|---|---|---|---|
| 1,665,267 | 4/1928 | Jernberg | 239/2 R X |
| 2,052,626 | 9/1936 | Houghton, Jr. | 239/2 R |
| 2,070,038 | 2/1937 | Batt | 239/2 X |
| 2,665,168 | 1/1954 | Kerlin | 239/2 |
| 2,756,097 | 7/1956 | Brandau et al. | 239/2 R |
| 3,357,926 | 12/1967 | Power et al. | 239/14 X |
| 3,362,915 | 1/1968 | Micek | 239/14 X |
| 3,730,432 | 5/1973 | Bennett | 239/2 R |

*Primary Examiner*—M. Henson Wood, Jr.
*Assistant Examiner*—Michael Mar
*Attorney, Agent, or Firm*—R. S. Sciascia; Roy Miller; Lloyd E. Pohl

[57] ABSTRACT

Apparatus and a method for dispersing weather modification nuclei are disclosed. The apparatus comprises a blower, a feed hopper for containing dry particles of the weather modification material and feeding them into the path of gas coming from the blower, a dusting chamber in which the particles are separated from one another and a heated tube through which the particles pass, are vaporized, and from which the vapor is dispersed into the atmosphere where the vapor reconstitutes itself into weather modification nuclei.

2 Claims, 2 Drawing Figures

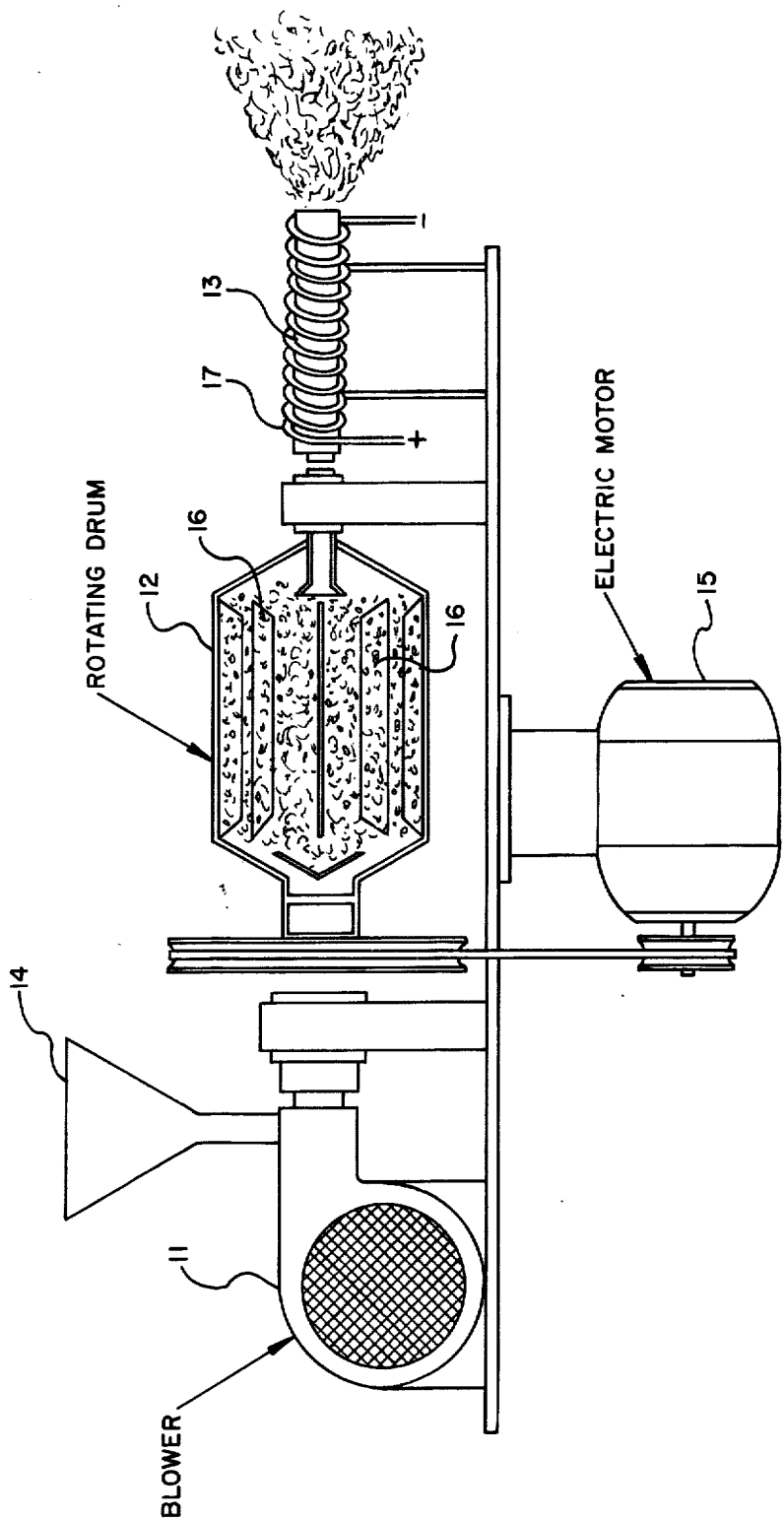

PARTICLE VAPORIZER

BACKGROUND OF THE INVENTION

1. Field of the Invention

This invention relates to apparatus and a method for dispersing weather modification nuclei.

2. Description of the Prior Art

In the prior art, dispersion of weather modification nuclei (AgI crystals and the like), whether from the surface of the earth or airborne vehicle, has commonly been accomplished by dissolving the weather modification material and auxilliary solubilizing agents in a flammable solvent, spraying the solution and igniting the spray. The solvent is burned, whereby the solid nuclei of weather modification material are reconstituted and dispersed into the atmosphere.

The foregoing method has certain disadvantages. First, the solvents used are flammable (acetone is the most commonly used solvent). This makes the process undesirable for use in certain places such as on board aircraft or a ship. Second, the method is limited to the generation of only a few types of weather modification nuclei such as AgI, and chemicals complex of AgI with KI and NaI. It would accordingly be desirable to have a method and apparatus for generating weather modification nuclei in which a solvent was unnecessary and which could be used to generate other cloud seeding nuclei in addition to those named above.

SUMMARY OF THE INVENTION

It has not been found that if dry particles of weather modification material are fed through a heated tube wherein they are vaporized, the particles reconstitute and disperse to function as weather modification nuclei upon leaving the heated tube and entering the atmosphere.

BRIEF DESCRIPTION OF THE DRAWING

The single FIGURE is an elevational view partially in cross section of apparatus according to this invention.

DESCRIPTION OF THE PREFERRED EMBODIMENT

The single FIGURE of the drawing shows, partially in elevation and partially in cross section, apparatus according to this invention. In the drawings, a blower which blows dry gas is indicated by the numeral 11. The gas may be air or it may be, if desired, an inert gas such as nitrogen. The gas blows from the blower 11 toward and into a dusting chamber 12 and from thence toward and into a heated tube 13. The gas, carrying particles of weather modification material, blows through heated tube 13 and into the atmosphere.

At some point between the blower and the dusting chamber, the weather modification material fed from a hopper 14 enters the stream of gas. In the dusting chamber which is, in actuality, a rotating drum rotated by a motor, turbulance created by a plurality of discrete particles of the weather modification material to be formed and separated one from the other. These particles then continue along with the flow of gas into heated tube 13.

In heated tube 13, the particles of dry weather modification material are vaporized by the heat. The temperature to which the tube must be heated depends on the weather modification material being used. It can be determined, for any particular material, by looking up that materials vaporization temperature in a chemical handbook or by determining that temperature by any other method known to the art. From tube 13, the vapor passes into the atmosphere and forms weather modification nuclei.

The tube or furnace 13 is shown, in the drawing, as being heated by an electric coil 17. However, other methods for heating the tube could be used as long as they raised the temperature within the tube to the desired level.

Apparatus according to this invention is advantageous in that no solvent is necessary. That is, it could be used on board an air craft or ship without the fire hazzard which is attendant when a method and apparatus requiring the use of a flammable solvent are used.

Tests in which various weather modification materials have been vaporized and dispersed according to this invention have produced good results. Silver iodide, when vaporized and dispensed according to this invention, produce nuclei that are active at the −4°C level according to this invention. Other weather modification materials such as CuS, $Pb_xO_yI_z$, LiI, and organic compounds can be vaporized and dispersed according to this invention. Those skilled in the art will recognize that by using the apparatus and method of the present invention which do not require the use of a solvent, the results produced, i.e., weather modification nuclei produced, can be as numerous as in methods wherein solvents are used. The qualities of the nuclei, i.e., sizes of the nuclei produced by the method and apparatus of this invention are similar to those of nuclei produced in methods wherein a solvent is required.

What is claimed is:

1. In a method for dispersing weather modification nuclei wherein a weather modification material is changed from one physical form to another, dispersed into the atmosphere and allowed to reconstitute itself into said nuclei, the improvement residing in blowing discrete solid particles of said weather modification material into an electrically heated tube, vaporizing said weather modification material within said tube and dispersing the vapor formed within said tube from said tube into the atmosphere where it reconstitutes itself into said nuclei.

2. In a method according to claim 1, the additional improvement residing in utilizing a stream of inert gas to blow said discrete particles into said heated tube.

* * * * *